United States Patent
Gupta et al.

(10) Patent No.: US 11,490,243 B2
(45) Date of Patent: Nov. 1, 2022

(54) OPEN ROAMING MULTI-ACCESS COST OPTIMIZER SERVICE

(71) Applicant: Cisco Technology, Inc., San Jose, CA (US)

(72) Inventors: Arindam Gupta, Karnataka (IN); Devendra Dadhich, Rajasthan (IN); Tara Khoiwal, Gujarat (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 85 days.

(21) Appl. No.: 17/074,968

(22) Filed: Oct. 20, 2020

(65) Prior Publication Data

US 2022/0124477 A1    Apr. 21, 2022

(51) Int. Cl.
*H04W 8/02* (2009.01)
*H04M 15/00* (2006.01)

(52) U.S. Cl.
CPC ............. *H04W 8/02* (2013.01); *H04M 15/58* (2013.01)

(58) Field of Classification Search
CPC ................................ H04W 8/02; H04M 15/58
See application file for complete search history.

(56) References Cited

U.S. PATENT DOCUMENTS

| | | | | |
|---|---|---|---|---|
| 6,070,076 A | * | 5/2000 | Valentine | H04M 15/67 455/445 |
| 6,574,464 B1 | * | 6/2003 | Chen | H04Q 3/0029 455/406 |
| 7,712,100 B2 | | 5/2010 | Fellenstein et al. | |
| 8,649,807 B1 | * | 2/2014 | Oroskar | H04W 8/02 455/458 |
| 2003/0083991 A1 | | 5/2003 | Kikinis | |
| 2003/0186676 A1 | | 10/2003 | Ogman et al. | |

(Continued)

FOREIGN PATENT DOCUMENTS

| | | |
|---|---|---|
| GB | 2503990 A | 1/2014 |
| WO | 2011026385 A1 | 3/2011 |

OTHER PUBLICATIONS

Lama et al., "AROMA: Automated Resource Allocation and Configuration of MapReduce Environment in the Cloud" Proceedings of the 9th International Conference on Autonomic Computing, Sep. 2012, pp. 1-10.

(Continued)

*Primary Examiner* — Barry W Taylor
(74) *Attorney, Agent, or Firm* — Edell, Shapiro & Finnan, LLC

(57) ABSTRACT

A method is performed at a control center in a home network. The control center (CC) detects roaming of a user equipment (UE) engaged in a call across different access networks operated by different service providers and that employ different types of radio access technology (RAT) to attach to the UE. The CC identifies the different service providers and the different types of RAT associated with the different access networks. While the UE is roaming, the CC tracks different data usages for the UE on the different access networks. The CC categorizes the different data usages based on the different service providers and the different types of RAT associated with the different access networks. When the call terminates, the CC determines a total cost for data usage on the call based on the different data usages, the different types of RAT, and the different service providers.

20 Claims, 9 Drawing Sheets

(56) References Cited

U.S. PATENT DOCUMENTS

| | | | |
|---|---|---|---|
| 2005/0182718 A1* | 8/2005 | Kortum | H04M 15/84 |
| | | | 705/40 |
| 2008/0160955 A1* | 7/2008 | Giesecke | H04W 4/24 |
| | | | 455/406 |
| 2010/0299366 A1 | 11/2010 | Stienhans et al. | |
| 2011/0191781 A1 | 8/2011 | Karanam et al. | |
| 2014/0047342 A1 | 2/2014 | Breternitz et al. | |
| 2014/0115592 A1 | 4/2014 | Frean et al. | |
| 2015/0039764 A1 | 2/2015 | Beloglazov et al. | |
| 2015/0067680 A1 | 3/2015 | Phelan et al. | |
| 2015/0186228 A1 | 7/2015 | Kumar | |
| 2016/0066261 A1 | 3/2016 | Nasielski et al. | |
| 2016/0165065 A1* | 6/2016 | Damstra | H04M 15/07 |
| | | | 455/408 |
| 2016/0192312 A1* | 6/2016 | Lambert | H04W 48/18 |
| | | | 455/435.2 |
| 2016/0359697 A1 | 12/2016 | Scheib et al. | |
| 2017/0132042 A1 | 5/2017 | Cherkasova et al. | |
| 2017/0200113 A1 | 7/2017 | Cherkasova et al. | |
| 2017/0228676 A1 | 8/2017 | Cherkasova et al. | |
| 2018/0150783 A1 | 5/2018 | Xu et al. | |
| 2018/0159727 A1 | 6/2018 | Liu et al. | |
| 2019/0155643 A1 | 5/2019 | Bhageria et al. | |

OTHER PUBLICATIONS

Garcia-Galan et al., "Automated Configuration Support for Infrastructure Migration to the Cloud", Future Generation Computer Systems, Mar. 10, 2015, pp. 1-19.

Herodotou et al., "No One (Cluster) Size Fits All: Automatic Cluster Sizing for Data-Intensive Analytics", Proceedings of the 2nd ACM Symposium on Cloud Computing, Oct. 2011, pp. 1-14.

WBA Roaming Work Group, "The WRIX Framework Overview and Introduction", Wireless Broadband Alliance, Version 2.0.0, Mar. 2020, 37 pages.

* cited by examiner

300

302 — RETRIEVE PREDETERMINED LIST OF KNOWN SERVICE PROVIDES THAT HAVE ALREADY ESTABLISHED/EXISTING RATE PLANES WITH HOME NETWORK, AND COMPARE EACH DIFFERENT SERVICE PROVIDER TO LIST OF KNOWN SERVICE PROVIDERS

304 — WHEN COMPARE INDICATES PARTICULAR SERVICE PROVIDER AMONG DIFFERENT SERVICE PROVIDERS IS NOT ON LIST, AUTOMATICALLY SEND, TO PARTICULAR SERVICE PROVIDER/ENTERPRISE, REQUEST TO ESTABLISH NEW RATE PLANE FOR PARTICULAR SERVICE PROVIDER ON HOME NETWORK

FIG.3

OPEN ROAMING MULTI-ACCESS COST OPTIMIZER SERVICE

TECHNICAL FIELD

The present disclosure relates to tracking data usage costs during roaming of user equipment (UE) across wireless networks.

BACKGROUND

Mobile devices, managed by a control center (CC) on a home network, roam during calls to multi-radio access network (RAN) environments such as WiFi®, private Long-Term Evolution (pLTE), and Long Range (LoRA) wide area network (WAN) (LoRaWAN) environments, for example. In the multi-RAN environment, network services may be provided by different services providers (SPs), which may be known or unknown to the control center. The service cost of the different networks are usually different. For example, a cost of data usage during a call on a WiFi network may be cheaper than a cost of data usage on a call on a cellular network. Additionally, tariffs assessed by different service providers may also differ across the different multi-RAN environments. As a result, the control center faces a considerable challenge when faced with generating bills/invoices for a total cost of data usage incurred by a roaming mobile device, because the total cost varies depending on the different RAN environments and associated service providers encountered during the roaming.

BRIEF DESCRIPTION OF THE DRAWINGS

FIG. 3 shows operations, expanding on a cost determining operation of the method of FIG. 2, to identify a new service provider, according to an example embodiment.

DESCRIPTION OF EXAMPLE EMBODIMENTS

Overview

A control center residing in a home network performs a method. The control center detects roaming of a user equipment (UE) engaged in a call across different access networks operated by different service providers and that employ different types of radio access technology (RAT) to attach to the UE. The control center identifies the different service providers and the different types of RAT associated with the different access networks. While the UE is roaming, the control center tracks different data usages for the UE on the different access networks. The control center categorizes the different data usages based on the different service providers and the different types of RAT associated with the different access networks. When the call terminates, the control center determines a total cost for data usage on the call based on the different data usages, the different types of radio access technology, and the different service providers associated with the different data usages.

Example Embodiments

Figure 1:
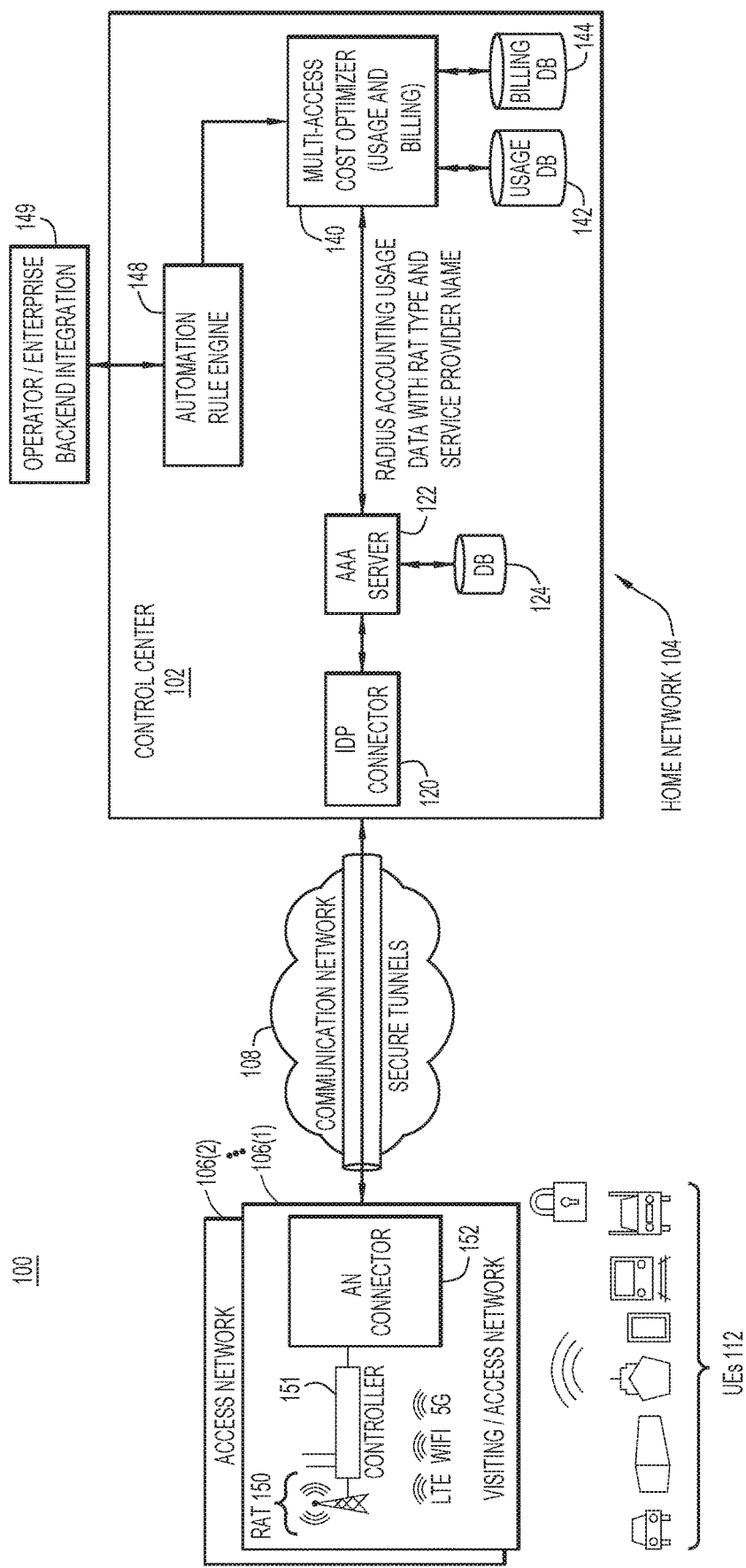
FIG. 1 is a block diagram of a system that implements cost optimization in a multi-radio access network (RAN) environment based on radio access technology (RAT type) and service provider as a user equipment (UE) roams, according to an example embodiment.

With reference to FIG. 1, there is shown a block diagram of an example system 100 that implements cost optimization for a user equipment (UE) that roams across multiple radio access networks (RANs), based on radio access technology (RAT type) and service provider. System 100 includes a cloud-based control center (CC) 102 on a home network 104, wireless/radio access networks 106(1) and 106(2) (also each referred to as an "access network," a "visiting network," and a "roaming network"), a communication network 108 over which the control center/home network and the access networks communicate with each other (e.g., using secure links or tunnels), and UEs 112 that connect wirelessly with and roam across the access networks. Communication network 108 may include one or more wide area networks (WANs) such as the Internet, and one or more local area networks (LANs), for example.

Control center 102 and access networks 106(1) and 106(2) (collectively referred to as "access networks 106") may belong to an Open Roaming federation. The Open Roaming federation links together access providers (e.g., providers of WiFi, 5G, and cellular access networks, for example) and trusted identity providers (such as service providers, UEs, cloud providers, and enterprises) to permit seamless roaming by the UEs across the access networks operated by the access providers. The aforementioned members of the Open Roaming federation register authentication and authorization credentials with control center 102/home network 104, which then authenticates and authorize UEs on behalf of the access networks as the UEs roam seamlessly across and attach to the access networks during calls.

For convenience, only two access networks are shown in FIG. 1. In practice, there are many more access networks that communicate with control center 102/home network 104. Mobile devices, wireless communication devices (or simply "wireless devices"), Internet-of-Thing (IoT) devices, wireless client devices, subscriber devices, user devices, and so on, are collectively referred to as user equipments (UEs), and singularly referred to as a UE. A UE may include, for example, a mobile phone, a smartphone, a laptop computer, a tablet computer, a personal computer, a wireless sensor, a radio frequency (RF) tag/IoT device, and so on.

Control center 102 hosts or communicates with a collection of components that interact with each other to implement the embodiments presented herein. The components may include cloud-based services and/or applications hosted on one or more servers, for example. The components include an identity provider (IDP) connector 120 that provides an interface through which the components of control center 102/home network 104 communicate with access networks 106 over secure tunnels via network 108, an Authentication, Authorization, and Accounting (AAA) server 122 to perform authentication and authorization of UEs (e.g., UEs 112) on behalf of access networks (e.g., access networks 106) responsive to requests from the UEs to attach to the access networks. AAA server 122 stores results of the authentication and authorization of the UEs in a database (DB) 124 of control center 102.

Control center 102 also include a multi-access cost optimizer 140 (referred to simply as "cost optimizer 140") that performs cost optimization according to embodiments presented herein, a data usage database 142, and a billing database 144. As will be described in further detail below, cost optimizer 140 and AAA server 122 exchange with each other information including, but not limited to, Remote Authentication Dial-In User Service (RADIUS) accounting data usage information, Radio Access Technology (RAT) types, server provider names/identifiers, and so on. Data usage database 142 stores data usage records that indicate the amount of data used by the UEs during their calls. Billing database 144 stores a list of known service providers, their associated enterprises, rate plans for the known service providers, and billing invoices for UE subscribers. Control center 102 also includes an automation rule engine 148 configured to communicate with cost optimizer 140 and enterprise entities 149 (simply referred to as "entities") associated with the service providers.

Access networks 106 provide wireless access/connectivity to UEs 112 over wireless/air interfaces, as is known. An access network may be provided by a service provider, an enterprise, or a third party system integrator. Therefore, the term "service provider" as used herein encompasses both typical cellular network service providers as well as enterprises that provide network services, such as WiFi, pLTE, and the like. Access networks 106 each includes, respectively, RAT 150 comprising radio access infrastructure or equipment and methods to communicate wirelessly with UEs 112, a controller 151 to control the access network, and an access network (AN) connector 152. Controller 151 may include a wireless local area network (WLAN), mobility management entity (MME), and/or gateway (G) general packet radio service (GPRS) (G) support (S) node (N) (GGSN), for example. AN connector 152 serves as an interface through which RAT 150 and controller 151 communicate with IDP connector 120 of control center 102 (via network 108).

Access networks 106 may employ different types of RAT, including radio access technologies (RATs) based on any known or hereafter developed wireless standards, such as, but not limited to, one or more IEEE 802.11 standards (i.e., the WiFi standards), and one or more cellular standards, e.g., Global System for Mobile Communications (GSM), Universal Mobile Telecommunications System (UMTS), LTE, and 5G. As used herein, the "type" of RAT or "RAT type" indicates or refers to the wireless technology/standard employed by the RAT. In an example in which access networks 106(1) and 106(2) employ different types of RAT, access network 106(1) may employ WiFi RAT (i.e., the RAT type is WiFi), while access network 106(2) may employ cellular RAT (i.e., the RAT type is cellular).

Figure 2:
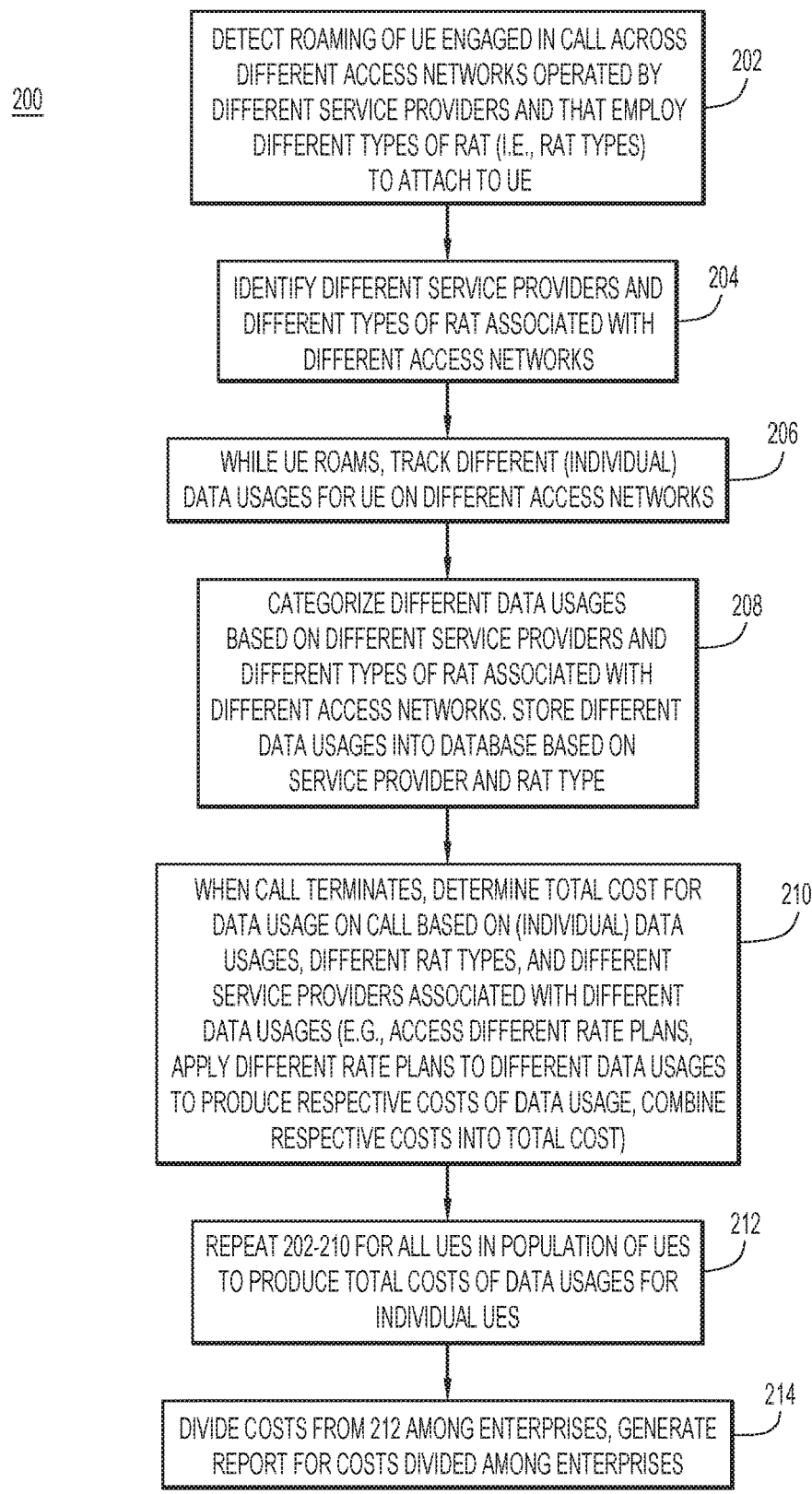
FIG. 2 is a flowchart of a method of optimizing billing for the UE engaged in a call performed primarily by a cost optimizer of a control center of the system, according to an example embodiment.

Referring to FIG. 2, there is a flowchart of an example method 200 of optimizing billing for a UE engaged in a call performed primarily by cost optimizer of control center 102, according to embodiments presented herein. Method 200 assumes that, during the call, the UE roams across (and attaches to) multiple/different access networks that (i) are operated under corresponding ones of different service providers, and (ii) employ corresponding ones of different types of RAT, i.e., different RAT types. For example, the UE may roam across access network 106(1) that employs WiFi RAT and access network 106(2) that employs cellular RAT. Method 200 also assumes that a list of known service providers (i.e., a list of service provider identifiers (IDs)) have established rate plans on control center 102/home network 104. A rate plan for a service provider specifies one or more types of RAT and a rate (i.e., cost) for data usage for each of the one or more types of RAT, e.g., WiFi rate=x dollars/GB, cellular rate=y dollars/GB, and so on.

At 202, control center 102 detects the roaming of the UE during the call across the different access networks operated by the different service providers and that employ the different types of RAT. Control center 102 may detect the roaming and collect information associated with the roaming in the following manner. When the UE roams to an access network, the UE sends to the access network an attach request. Upon receiving the attach request, the access network generates an accounting request for the UE, and forwards the accounting request along with the attach request to control center 102/home network 104. Control center 102 detects the roaming of the UE based on receipt of one or more of the aforementioned requests from the access network. Collectively, the requests include various identifiers associated with the call, including a call identifier (i.e., a call or session identifier (ID)), an identifier of the UE (i.e., a UE ID), an identifier of the service provider (i.e., a service provider ID) associated with the access network, a type of RAT (i.e. RAT type) employed by the access network, and an identifier of an enterprise (i.e., an enterprise ID). In the event that the identifiers do not indicate the enterprise, control center 102 may use the service provider ID to find a matching enterprise ID in local databases provisioned on the control center.

At 204, control center 102 identifies the different service providers and the different types of radio access technology associated with the different access networks based on the information in the requests forwarded to the control center by the access networks. That is, control center 204 parses the requests to retrieve the aforementioned information from the requests. For example, control center 102 identifies [RAT type=WiFi, service provider SP1] for access network 106(1) and [RAT type=cellular, service provider SP2] for access network 106(2).

While the UE is roaming, at 206, control center 102 tracks different data usages for the UE on the different access networks. For example, control center 102 records an amount of data usage DU1 for the UE while the UE is attached to access network 106(1), an amount of data usage DU2 for the UE while the UE is attached to access network 106(2), and so on for all of the access networks to which the UE roams. Control center 102 may also record respective time usages by the UE on the different access networks.

At 208, control center 102 categorizes, indexes, and stores the different data usages for the UE in nodes/records (or "buckets) of data usage database 142 based on the different service providers and based on the different types of RAT associated with the different access networks. For example, control center 102 categorizes and associates data usage DU1 for the UE with service provider SP1 and RAT type=WiFi, and categorizes data usage DU2 for the UE with service provider SP2 and RAT type=cellular. Control center 102 may generate tuples of the form [call ID, UE ID, RAT type, service provider, enterprise, data usage] to represent respective (different) data usages on the access networks during the roams, and store information in the tuples in the nodes/records of data usage database 142. Control center 102 may subsequently retrieve the data usage from the records stored in usage database 142 using any of the fields in the tuples as a retrieval index. In the example in which the UE roams across access networks 106, control center 102 may generate tuples [call ID, UE ID, WiFi, SP1, enterprise E1, DU1] and [call ID, UE ID, cellular, SP2, enterprise E2, DU2] for data usages on access network 106(1) and access network 106(2). An example of data usage database 142 is described below in connection with FIG. 4.

After operation 208, upon receiving a notification that the call has terminated (i.e. when the call terminates), at 210, control center 102 retrieves/accesses from usage database 142 all of the data usages for the call using one or more suitable retrieval indexes, e.g., call ID, UE ID, RAT type, service provider ID, and/or enterprise ID. Using the information retrieved from data usage database 142, control center 102 determines a total cost for data usage on the call based on (i) the data usages incurred during the call on the different access networks, (ii) the different types of RAT, and (iii) the different service providers associated with the different data usages. Thus, control center 102 does not merely compute a flat rate cost for the data usage across all of the different RAT types and service providers. More specifically, control center 102 may determine the total cost for data usage using the following operations:
 a. Retrieve/access from billing database 144 different rate plans already established for the different service providers, when known.
 b. Apply the different rate plans to corresponding ones of the different data usages to produce respective costs of data usage for the different data usages. For example, (i) apply rate plan RP1 (for WiFi) for service provider SP1 to WiFi data usage DU1, to produce WiFi cost C1, (ii) apply rate plane RP2 (for cellular) for service provider SP2 to data usage DU2, to produce cellular cost C2, and so on.
 c. Combine the respective costs of data usage into the total cost. For example, add together the respective costs to produce the total cost.

Control center 102 may store the respective costs and the total cost for the call associated with UE in data usage database 142 and/or billing database 144. Control center 102 may also generate a billing invoice for the call and store the invoice in billing database 144. Additionally, control center 102 may identify an enterprise associated with the call (e.g., with the UE and/or subscriber), and then provide the billing invoice to the enterprise.

Operations 202-210 represent operations performed for a single UE on a single call; however, the operations may be applied across many UEs on many calls over time, as described below in connection with operations 212-214.

At 212, operations 202-210 (i.e., detecting, tracking, categorizing, and determining total cost for data usage) repeat for many individual UEs in a population of UEs of subscribers belonging to (i.e., that span) multiple enterprises associated with multiple service providers and their corresponding access networks with different types of RAT. The repeated passes through operations 202-210 populate data usage database 142 and billing database 144 with the information described above for all of the individual UEs in the population, and produce total costs of data usage for the individual UEs (i.e., a respective total cost of data usage for each of the individual UEs in the population).

At 214, control center 102 retrieves the information that populates data usage database 142 and billing database 144. Control center 102 divides the total costs of data usage for the individual UEs of the population of UEs among the enterprises based on the enterprise IDs associated with the data usage, to produce a total cost of data usage per enterprise across all of the enterprises. Control center 102 generates a report that indicates the total cost of data usage per enterprise for each of the enterprises. The report may be arranged to present a single pane view for an enterprise with data usage under different access networks highlighting cost comparisons and advantages.

With reference to FIG. 3, there are shown operations 300, expanding on cost determining operation 210, for handling unknown service providers.

At 302, control center 102 retrieves from billing database 144 a list of known service provides that have established rate planes with control center 102/home network 104. Control center 102 determines whether any of the different service providers identified during the call are not on the list. For example, control center 102 compares each of the different service providers to the list of known service providers.

At 304, when results of the compare operation indicate that a particular service provider among the different service providers is not on the list of known service providers, control center 102 automatically sends to the particular service provider and/or an enterprise associated with the particular service provider, a request to establish a new rate plane (in a partner account described below) for the particular service provider on the home network. Otherwise, no further action is taken.

Figure 4:
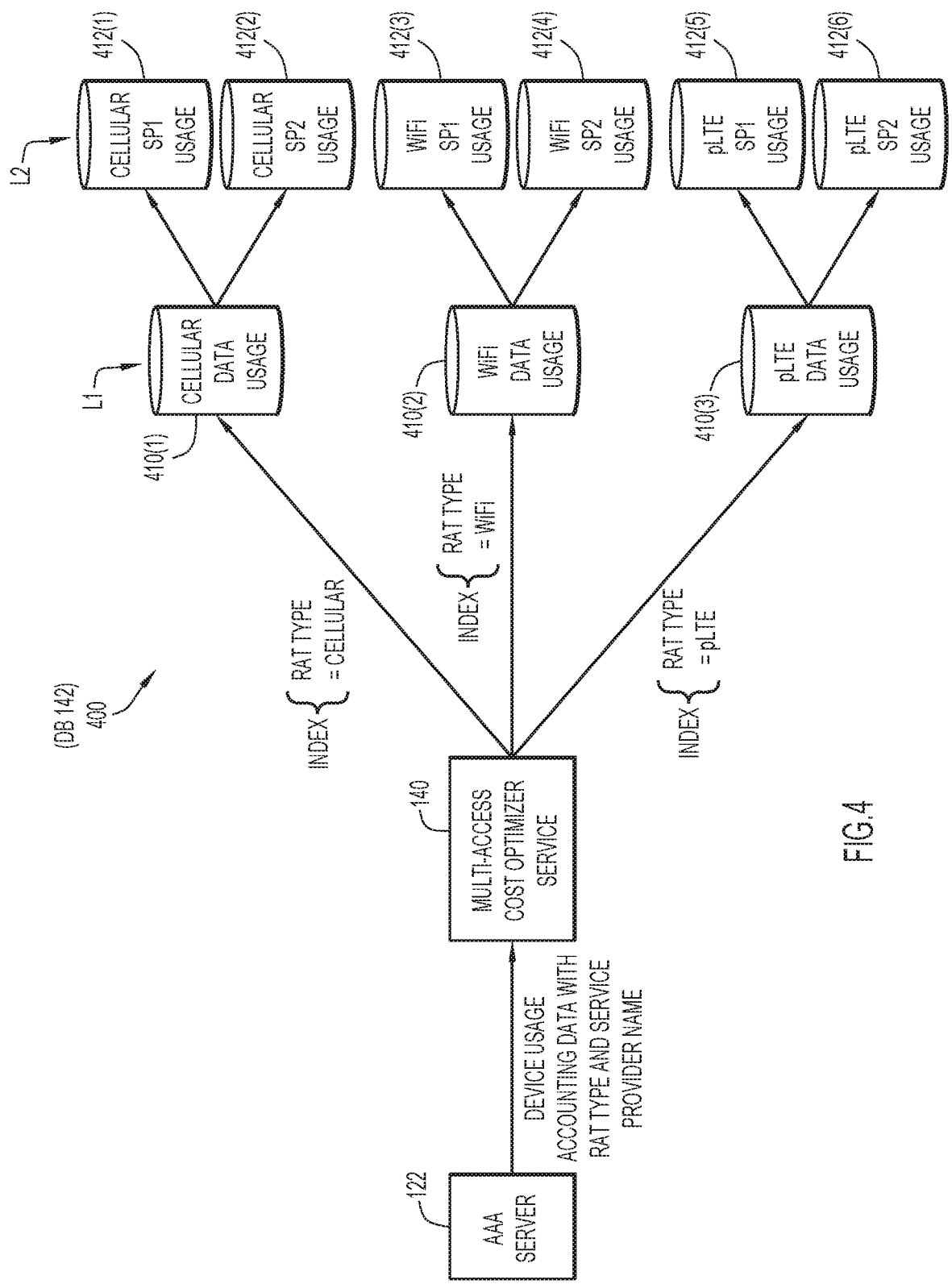
FIG. 4 is an illustration of data usage records stored in a data usage database as a result of interactions between an authentication, authorization, and accounting (AAA) server and the cost optimizer during the method of FIG. 2, according to an example embodiment.

With reference to FIG. 4, there is an illustration of example data usage records 400 stored in data usage database 142 as a result of interactions between AAA server 122, cost optimizer 140, and data usage database 142 that occur during method 200. Generally, the data usage accounting process described above persists data usage into different nodes or "buckets" first based on RAT type, e.g., cellular data usage is stored in a first bucket, WiFi data usage is stored in a second bucket, and so on. Then, under each such node, there are additional nodes or sub-nodes that contain data for each service provider. For example, WiFi data usage from service provider SP1 is stored into a WiFi SP1 node, while WiFi data usage from service provider SP2 is stored into a separate WiFi SP2 node, as shown in FIG. 4.

More specifically, by way of example, data usage database 142 employs a hierarchical tree structure to store data usage information in nodes of layers of the tree structure descending from a top layer L1 to a bottom layer L2. While a tree structure is shown, the data usage database may be embodied using any known or hereafter developed database structure. Nodes 410(1)-410(3) of top layer L1 are indexed by RAT type (i.e., per RAT type), while nodes 412(1)-412(6) of bottom layer L2 are indexed further by service provider (i.e., per RAT type, per service provider). In addition, once cost optimizer 140 computes costs associated with the data usages based on the information stored in the nodes of data usage database 142 in the manner described above, cost optimizer 140 may also store the costs in the nodes with the associated data usages from which the costs were computed.

In the example of FIG. 4, index (RAT type=cellular) directs traversal to node 410(1) of layer L1 for all cellular data usage underlying that node, index (RAT type=WiFi) directs traversal to node 410(2) of layer L1 for all WiFi data usage under that node, and so on. Once at node 410(i) of layer L1, a given service provider index SPi directs further traversal to underlying node 412(m) that stores data usage for a UE associated with service provider SPi, and the RAT type associated with that service provider. For example, supplying tuple [RAT type=WiFi, service provider SP1] to data usage database 142 results in traversal to node 412(3), from which data usage at that node may be retrieved. The nodes of layer L1 may store costs accumulated from the nodes below in layer L1.

As described above, the nodes of the tree structure may also store additional information to assist with traversal/retrieval and collation operations. The additional information may include call ID, UE ID, call times/duration, enterprise ID, and so on.

Figure 5:
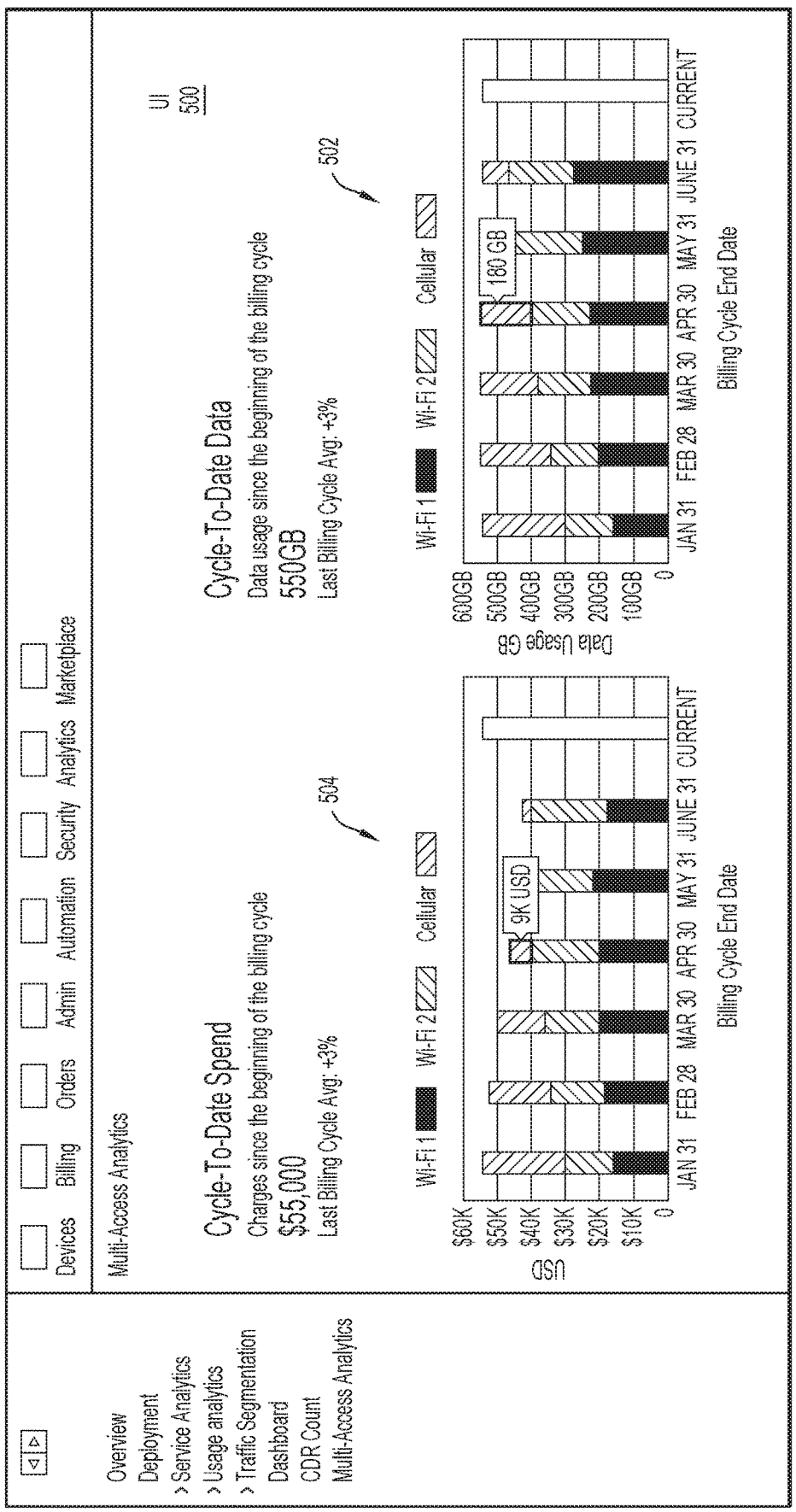
FIG. 5 is an illustration of a single pane multi-access analytics user interface (UI) capturing cellular and WiFi data usage with cost profiles for an enterprise, according to an example embodiment.

With reference to FIG. 5, there is an illustration of an example user interface (UI) 500 generated by control center 102 at operations 212 and 214, described above. UI 500 is a single pane multi-access analytics UI capturing cellular and WiFi data usage with cost profiles for an enterprise. UI 500 presents a first report 502 and a second report 504. First report 502 is a graph of total data usage vs. time for a population of UEs associated with the enterprise. Second report 504 is a graph of total cost of the data usage vs. time for the population of UEs associated with the enterprise.

Figure 6:
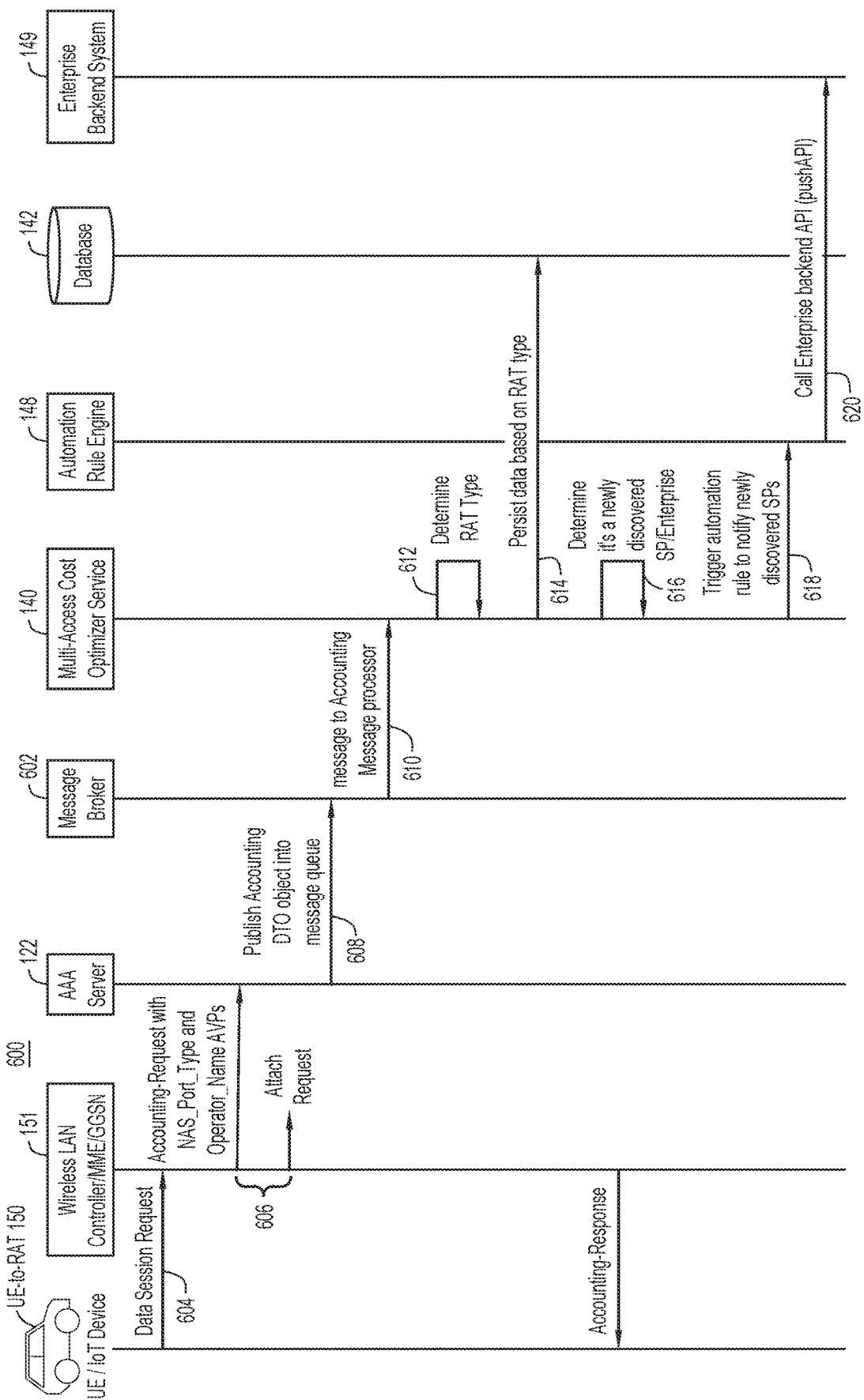
FIG. 6 is a transaction diagram for transactions between different components of the system and upon which the method of FIG. 2 may be based, according to an example embodiment.

With reference to FIG. 6, there is a transaction diagram or sequence of flows 600 between different components of system 100 and upon which method 200 may be based. FIG. 6 introduces a message broker 602 (not shown in FIG. 1) that serves as a message interface between AAA server 122 and cost optimizer 140. Message broker 602 may be integrated with either AAA server 122 and/or cost optimizer 140.

At 604, controller 151 of an access network receives a data session request (e.g., a network attach request) from a UE.

Responsive to the data session request/network attach request from the UE, at 606, controller 151 of the access network generates/originates an accounting request, and forwards the accounting request to AAA server 122 through AN connector 152 and IDP connector 120. The accounting request includes non-access stratum (NAS) port type, RAT type, operator name, and enterprise name attribute value pairs (AVPs). NAS port type/RAT type may be Evolved Universal Terrestrial Radio Access (E-UTRAN), narrowband (NB)-IoT, WiFi, new radio (NR) 5G, and the like. AAA server 122 receives the accounting request. Control center 102 also receives an attach request for the UE forwarded by the access network.

Responsive to the accounting request, at 608, AAA server 122 generates a data transfer object (DTO) including the information in the accounting request, and forwards the DTO to a message queue of message broker 602. At 610, message broker 602 forwards the DTO to cost optimizer 140, which receives the DTO.

At 612, cost optimizer 140 parses the DTO to discover and retrieve at least a RAT type of the access network, and a service provider ID. At 614, cost optimizer 140 stores the information retrieved from the DTO and associated information accessed from local databases based on the information in the DTO (e.g., collectively, call ID, UE ID, RAT type, service provider ID, enterprise ID, and so on) in a node of data usage database 142, based on (e.g., indexed by) the RAT type and the service provider ID. When the DTO does not carry an enterprise ID, cost optimizer 140 may use the service provider ID to find a matching or associated enterprise in local databases.

At 616, cost optimizer 140 determines whether the service provider (or enterprise) is known or not known, i.e., is a new service provider (or enterprise) that does not have an established rate plan. To do this, cost optimizer compares the service provider to a list of known service providers. When the service provider is not on the list, the service provider is declared new and, at 618, cost optimizer 140 notifies automation rule engine 148 of the new service provider. In response, at 620, automation rule engine 148 sends to an enterprise entity (e.g., enterprise entity 149) associated with the new service provider a message that a new rate plan for the new service provider should be established on home network 104. Automation rule engine 148 may send the message using an application programming interface (API).

Figure 7:
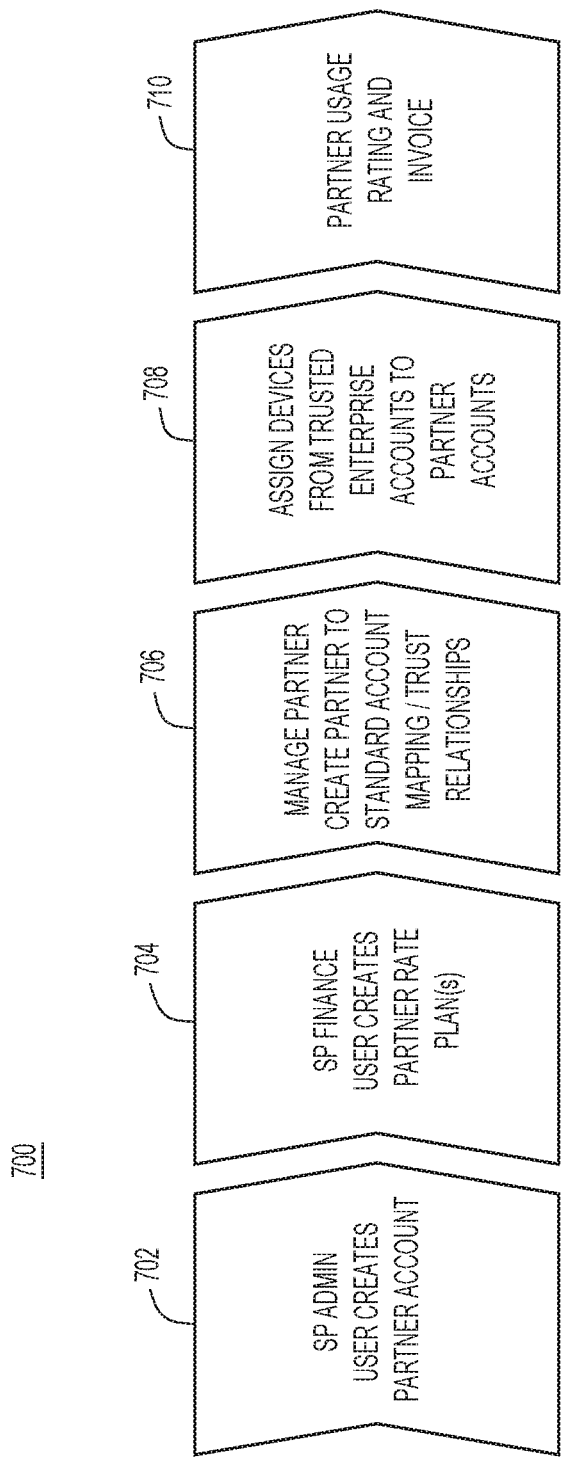
FIG. 7 shows a high level flow used to build a trust relationship between (i) data usage and billing services on a home network, and (ii) a service provider and an enterprise associated with the service provider, according to an example embodiment.

With reference to FIG. 7, there is shown an example high level flow 700 used to build a trust relationship between (i) data usage and billing services on home network 104, and (ii) a service provider and an enterprise associated with the service provider. The trust relationship is embodied in a partner account created by the flow. At 702, a service provider administrator creates a partner account. At 704, a service provider finance user creates one or more partner rate plans for data usage tied to RAT type(s), for example. At 706, a manage partner overseeing relationships between home network 104 and the service provider creates partner-to-standard account mapping/trust relationships on home network 104, e.g., billing database 144. This allows retrieval/access to the various partner accounts based on service provider/enterprise IDs. At 708, UEs are assigned from a trusted enterprise account (e.g., under Open Roaming) associated with the service provider to the partner account. This enables UE data usage cost actualization on home network 104. At 710, partner usage rating and billing/invoicing may be performed on home network 104 based on the rate plans in the partner account.

Figure 8:
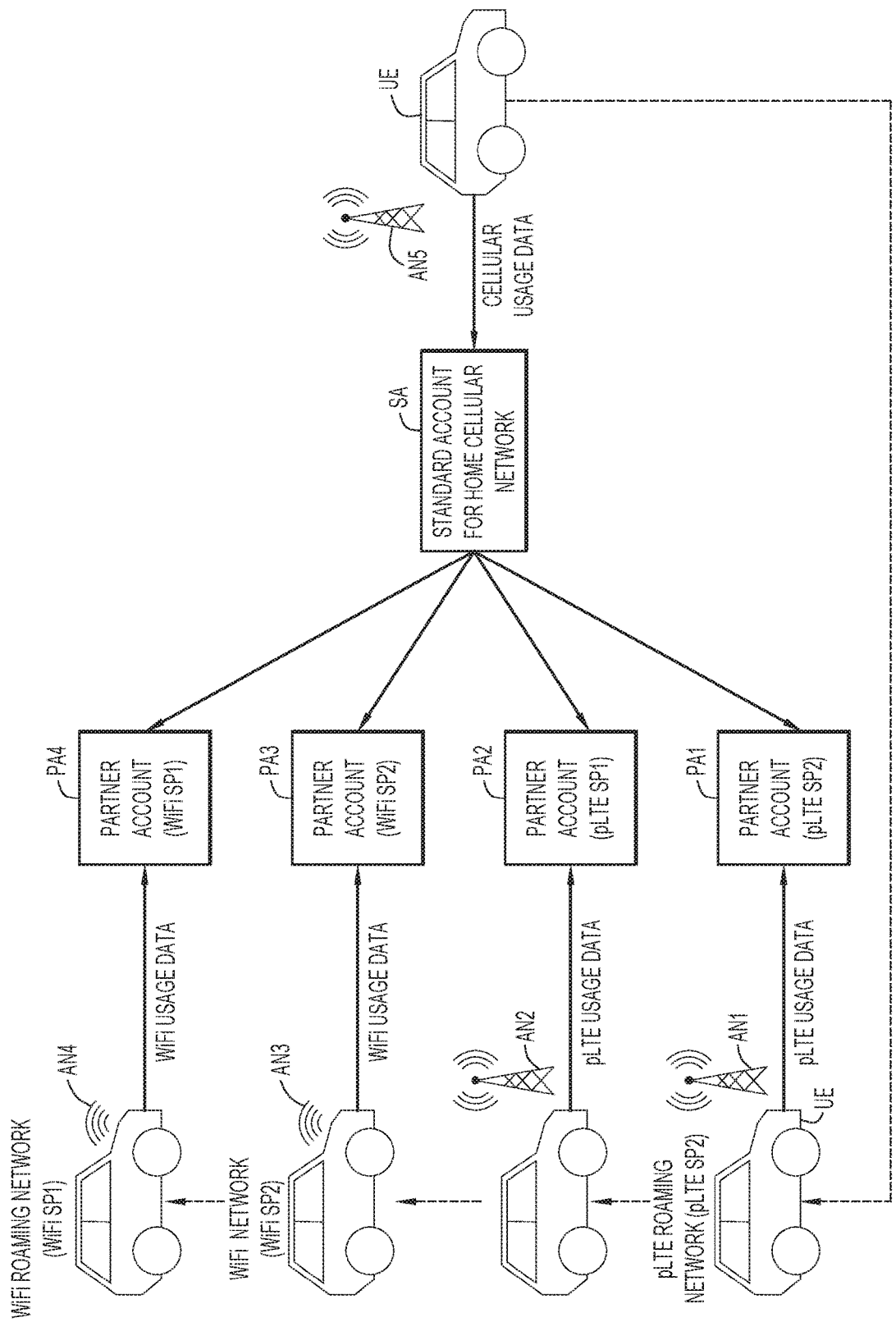
FIG. 8 shows relationships between radio access networks (also referred to simply as "access networks"), partner accounts, service providers, and a standard account on a home network, according to an example embodiment.

Once the partner accounts for service providers/enterprises are created, data usages for UEs on access networks operated by the service providers are covered under a standard account for home network 104 and the corresponding partner accounts, as shown in FIG. 8. With reference to FIG. 8, as a UE roams across access networks AN1 (RAT type=LTE), AN2 (pLTE), AN3 (WiFi), and AN4 (WiFi) operated respectively by service providers SP2, SP1, SP2, and SP1, data usage is charged under corresponding partner accounts PA1, PA2, PA3, and PA4, which are all covered under a standard account SA for home network 104. Cellular data usage on an access network AN5 associated with home network 104 does not require a partner account. Cost optimizer 140 generates data usage costs/billing invoices under partner accounts PA1-PA4.

The embodiments described above provider network and data aware cost optimization that results in cost savings. Consider the following simple example.

a. Cellular data cost is $0.5 per GB, and WiFi data cost is $0.06 per GB.
   b. Using flat rate billing across cellular and WiFi data, without employing the embodiments presented herein: assume monthly car data usage (cellular) of 1000 GB per month. Without tracking of other network data usage, such as WiFi, the total cost per month is $500.
   c. Using the embodiments presented herein, assume cellular data usage is 500 GB and assume another 500 GB in WiFi, and the data usage under both RAT types is tracked. Then, the total cost is $500*0.5+ 500*0.06=250+30=$280. Thus, the total saving is $220, which is an 80% cost saving per month.

In summary, embodiments presented herein include, but are not limited to, the following features.
   a. Creation of multiple data usage buckets/nodes in a database by RAT type and by service provider, e.g., as identified in accounting request data packet AVPs from the roaming UEs in a multi-RAN Open Roaming environment.
   b. Detection of a new service provider on a home network as UEs roam to a new access network and notification of a home network service provider and enterprise administration users about the same with recommendations for creating a new partner account with a new rate plan for optimized billing/invoicing.
   c. Optimized cost management for customers and enterprises owning UEs, which results in substantial cost savings and reports regarding the same.
   d. A single pane view for enterprises with data usage and cost profiles under different RANs and service providers highlighting cost comparisons and overall savings.

Figure 9:
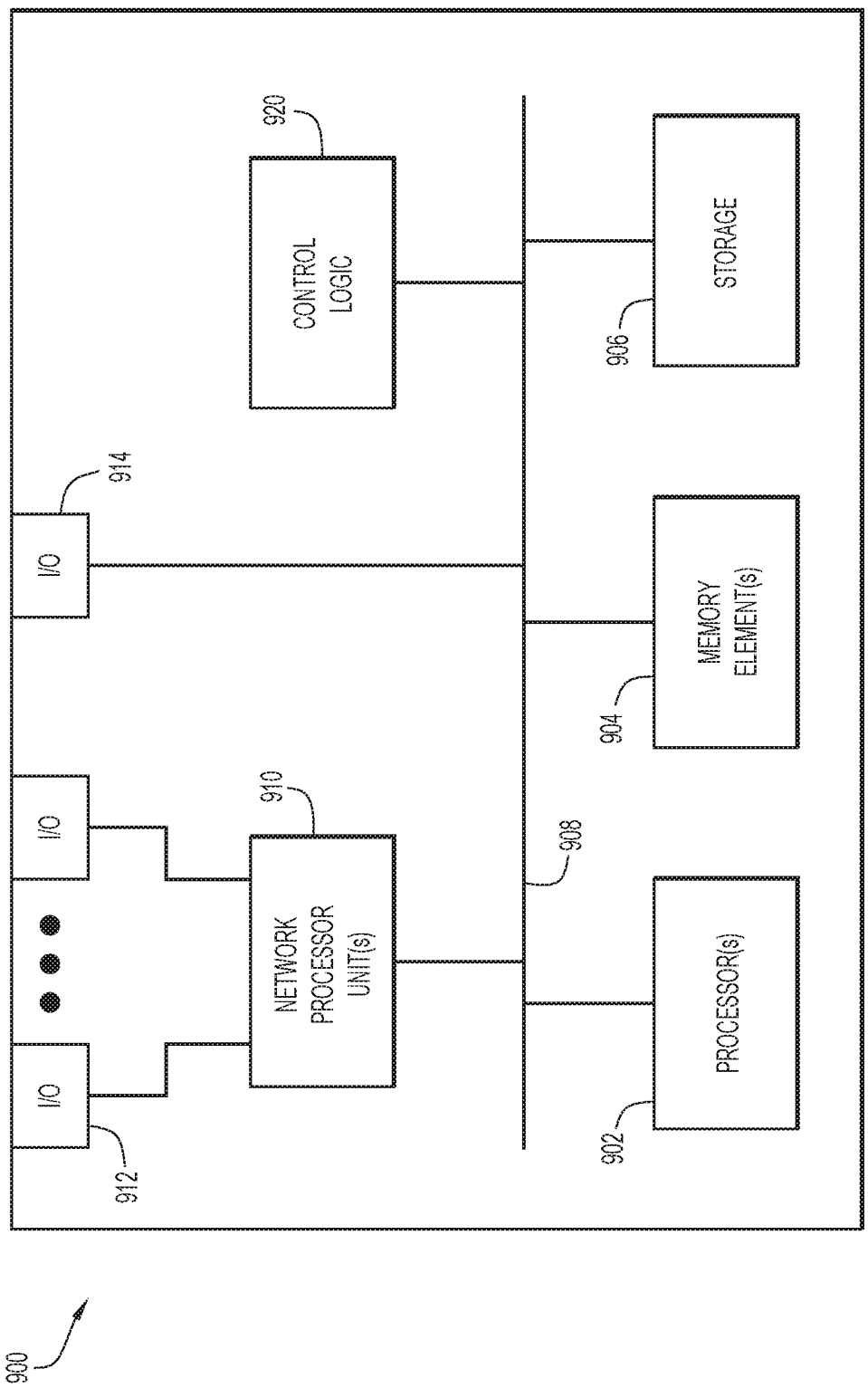
FIG. 9 is a hardware block diagram of a computing device that may perform functions associated with operations in connection with embodiments presented herein, according to an example embodiment.

Referring to FIG. 9, FIG. 9 illustrates a hardware block diagram of a computing device 900 that may perform functions associated with operations discussed herein in connection with the embodiments presented herein. In various embodiments, a computing device, such as computing device 900 or any combination of computing devices 900, may be configured as any entity/entities as discussed for the techniques depicted in connection with FIGS. 1-8 in order to perform operations of the various techniques discussed herein.

In at least one embodiment, the computing device 900 may include one or more processor(s) 902, one or more memory element(s) 904, storage 906, a bus 908, one or more network processor unit(s) 910 interconnected with one or more network input/output (I/O) interface(s) 912, one or more I/O interface(s) 914, and control logic 920. In various embodiments, instructions associated with logic for computing device 900 can overlap in any manner and are not limited to the specific allocation of instructions and/or operations described herein.

In at least one embodiment, processor(s) 902 is/are at least one hardware processor configured to execute various tasks, operations and/or functions for computing device 900 as described herein according to software and/or instructions configured for computing device 900. Processor(s) 902 (e.g., a hardware processor) can execute any type of instructions associated with data to achieve the operations detailed herein. In one example, processor(s) 902 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 904 and/or storage 906 is/are configured to store data, information, software, and/or instructions associated with computing device 900, and/or logic configured for memory element(s) 904 and/or storage 906. For example, any logic described herein (e.g., control logic 920) can, in various embodiments, be stored for computing device 900 using any combination of memory element(s) 904 and/or storage 906. Note that in some embodiments, storage 906 can be consolidated with memory element(s) 904 (or vice versa), or can overlap/exist in any other suitable manner.

In at least one embodiment, bus 908 can be configured as an interface that enables one or more elements of computing device 900 to communicate in order to exchange information and/or data. Bus 908 can be implemented with any architecture designed for passing control, data and/or information between processors, memory elements/storage, peripheral devices, and/or any other hardware and/or software components that may be configured for computing device 900. In at least one embodiment, bus 908 may be implemented as a fast kernel-hosted interconnect, potentially using shared memory between processes (e.g., logic), which can enable efficient communication paths between the processes.

In various embodiments, network processor unit(s) 910 may enable communication between computing device 900 and other systems, entities, etc., via network I/O interface(s) 912 to facilitate operations discussed for various embodiments described herein. In various embodiments, network processor unit(s) 910 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 900 and other systems, entities, etc. to facilitate operations for various embodiments described herein. In various embodiments, network I/O interface(s) 912 can be configured as one or more Ethernet port(s), Fibre Channel ports, and/or any other I/O port(s) now known or hereafter developed. Thus, the network processor unit(s) 910 and/or network I/O interface(s) 912 may include suitable interfaces for receiving, transmitting, and/or otherwise communicating data and/or information in a network environment.

I/O interface(s) 914 allow for input and output of data and/or information with other entities that may be connected to computer device 900. For example, I/O interface(s) 914 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 920 can include instructions that, when executed, cause processor(s) 902 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 920) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 904 and/or storage 906 can store data, software, code, instructions (e.g., processor instructions), logic, parameters, combinations thereof, and/or the like used for operations described herein. This includes memory element(s) 904 and/or storage 906 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 902.11 (e.g., Wi-Fi®/Wi-Fi6®), IEEE 902.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 9 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 9) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

In summary, in one aspect, a method is provided comprising: at a control center in a home network, detecting roaming of a user equipment (UE) engaged in a call across different access networks operated by different service providers and that employ different types of radio access technology to attach to the UE; identifying the different service providers and the different types of radio access technology associated with the different access networks; while the UE is roaming, tracking different data usages for the UE on the different access networks; categorizing the different data usages based on the different service providers and the different types of radio access technology associated with the different access networks; and when the call terminates, determining a total cost for data usage on the call based on the different data usages, the different types of radio access technology, and the different service providers associated with the different data usages.

In another aspect, an apparatus is provided comprising: a network processor unit to communicate with one or more networks; and a processor coupled to the network processor and configured to perform: at a home network, detecting roaming of a user equipment (UE) engaged in a call across different access networks operated by different service providers and that employ different types of radio access technology to attach to the UE; identifying the different service providers and the different types of radio access technology associated with the different access networks; while the UE is roaming, tracking different data usages for the UE on the different access networks; categorizing the different data usages based on the different service providers and the different types of radio access technology associated with the different access networks; and when the call terminates, determining a total cost for data usage on the call based on the different data usages, the different types of radio access technology, and the different service providers associated with the different data usages.

In yet another aspect, a non-transitory compute readable medium is provided. The medium is encoded with instructions that, when executed by a processor, cause the processor to perform: at a control center in a home network, detecting roaming of a user equipment (UE) engaged in a call across different access networks operated by different service providers and that employ different types of radio access technology to attach to the UE; identifying the different service providers and the different types of radio access technology associated with the different access networks; while the UE is roaming, tracking different data usages for the UE on the different access networks; categorizing the different data usages based on the different service providers and the different types of radio access technology associated with the different access networks; and when the call terminates, determining a total cost for data usage on the call based on the different data usages, the different types of radio access technology, and the different service providers associated with the different data usages.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
at a control center in a home network, detecting roaming of a user equipment (UE) engaged in a call across different access networks operated by different service providers and that employ different types of radio access technology to attach to the UE;
identifying the different service providers and the different types of the radio access technology associated with the different access networks;
while the UE is roaming, tracking different data usages for the UE on the different access networks;
categorizing the different data usages based on the different service providers and the different types of the radio access technology associated with the different access networks;
when the call terminates, determining a total cost for data usage on the call based on the different data usages, the different types of the radio access technology, and the different service providers associated with the different data usages; and
upon determining that a particular service provider among the different service providers is not on a list of known service providers that have existing rate plans established with the home network, automatically sending to the particular service provider or its associated enterprise a request to establish a new rate plane for the particular service provider on the home network.

2. The method of claim 1, wherein:
categorizing includes storing the different data usages into nodes of a database that categorizes data usage by service provider and by type of radio access technology; and
determining includes retrieving the different data usages from the nodes of the database based on an identifier of the UE, the different service providers, and the different types of the radio access technology.

3. The method of claim 2, wherein:
the call is identified by a call identifier;
storing the different data usages in the database includes indexing the different data usages in the database with at least the identifier of the UE and the call identifier; and
retrieving includes using the identifier of the UE and the call identifier.

4. The method of claim 2, further comprising:
repeating detecting, identifying, tracking, categorizing, and determining for individual UEs of a population of UEs that span multiple enterprises associated with multiple service providers, to produce total costs of data usage for the individual UEs;
dividing the total costs of data usage for the individual UEs among the multiple enterprises associated with the multiple service providers, to produce a total cost of data usage per enterprise; and
generating a report that indicates the total cost of data usage per enterprise for each of the multiple enterprises.

5. The method of claim 1, wherein the different types of the radio access technology include cellular and WiFi.

6. The method of claim 1, wherein determining the total cost for data usage on the call includes:
accessing different rate plans established with the home network for the different service providers;
applying the different rate plans to corresponding ones of the different data usages to produce respective costs of data usage for the different data usages; and
combining the respective costs of data usage into the total cost.

7. The method of claim 1, wherein:
determining includes comparing each of the different service providers to the list of the known service providers that have the existing rate plans established with the home network.

8. The method of claim 1, wherein:
detecting includes receiving, from the different access networks, accounting requests that the different access networks originate responsive to the roaming of the UE to the different access networks, wherein the accounting requests each indicate respective ones of the different service providers and the different types of the radio access technology; and
identifying includes parsing the accounting requests to discover the different service providers and the different types of the radio access technology.

9. An apparatus comprising:
a network processor unit to communicate with one or more networks; and
a processor coupled to the network processor unit and configured to perform:
at a home network, detecting roaming of a user equipment (UE) engaged in a call across different access networks operated by different service providers and that employ different types of radio access technology to attach to the UE;
identifying the different service providers and the different types of the radio access technology associated with the different access networks;
while the UE is roaming, tracking different data usages for the UE on the different access networks;
categorizing the different data usages based on the different service providers and the different types of the radio access technology associated with the different access networks;
when the call terminates, determining a total cost for data usage on the call based on the different data usages, the different types of the radio access technology, and the different service providers associated with the different data usages; and
upon determining that a particular service provider among the different service providers is not on a list of known service providers that have existing rate plans established with the home network, automatically sending to the particular service provider or its associated enterprise a request to establish a new rate plane for the particular service provider on the home network.

10. The apparatus of claim 9, wherein:
the processor is configured to perform categorizing by storing the different data usages into nodes of a database that categorizes data usage by service provider and by type of radio access technology; and
the processor is configured to perform determining by retrieving the different data usages from the nodes of the database based on an identifier of the UE, the different service providers, and the different types of the radio access technology.

11. The apparatus of claim 10, wherein:
the call is identified by a call identifier;

the processor is configured to perform storing the different data usages in the database by indexing the different data usages in the database with at least the identifier of the UE and the call identifier; and the processor is configured to perform retrieving by using the identifier of the UE and the call identifier.

12. The apparatus of claim 10, wherein the processor is further configured to perform:

repeating detecting, identifying, tracking, categorizing, and determining for individual UEs of a population of UEs that span multiple enterprises associated with multiple service providers, to produce total costs of data usage for the individual UEs;

dividing the total costs of data usage for the individual UEs among the multiple enterprises associated with the multiple service providers, to produce a total cost of data usage per enterprise; and generating a report that indicates the total cost of data usage per enterprise for each of the multiple enterprises.

13. The apparatus of claim 9, wherein the different types of the radio access technology include cellular and WiFi.

14. The apparatus of claim 9, wherein the processor is configured to perform determining the total cost for data usage on the call by:

accessing different rate plans established with the home network for the different service providers;

applying the different rate plans to corresponding ones of the different data usages to produce respective costs of data usage for the different data usages; and combining the respective costs of data usage into the total cost.

15. The apparatus of claim 9, wherein the processor is configured to perform determining by comparing each of the different service providers to the list of the known service providers that have the existing rate plans established with the home network.

16. The apparatus of claim 9, wherein:

the processor is configured to perform detecting by receiving, from the different access networks, accounting requests that the different access networks originate responsive to the roaming of the UE to the different access networks, wherein the accounting requests each indicate respective ones of the different service providers and the different types of the radio access technology; and the processor is configured to perform identifying by parsing the accounting requests to discover the different service providers and the different types of the radio access technology.

17. A non-transitory computer readable medium encoded with instructions that, when executed by a processor, cause the processor to perform:

at a control center in a home network, detecting roaming of individual user equipments (UEs) among a population of UEs that span multiple enterprises engaged in calls across different access networks operated by different service providers associated with the multiple enterprises and that employ different types of radio access technology to attach to the individual UEs;

identifying for the individual UEs the different service providers and the different types of the radio access technology associated with the different access networks;

while the individual UEs are roaming, tracking different data usages for the individual UEs on the different access networks;

categorizing the different data usages for the individual UEs based on the different service providers and the different types of the radio access technology associated with the different access networks;

when the calls terminate, determining total costs for data usage for the individual UEs on the calls based on the different data usages, the different types of the radio access technology, and the different service providers associated with the different data usages;

dividing the total costs for data usage for the individual UEs among the multiple enterprises, to produce a total cost of data usage per enterprise; and generating a report that indicates the total cost of data usage per enterprise.

18. The non-transitory computer readable medium of claim 17, wherein:

the instructions to cause the processor to perform categorizing include instructions to cause the processor to perform storing the different data usages into nodes of a database that categorizes data usage by service provider and by type of radio access technology; and the instructions to cause the processor to perform determining include instructions to cause the processor to perform retrieving the different data usages from the nodes of the database based on identifiers of the individual UEs, the different service providers, and the different types of the radio access technology.

19. The non-transitory computer readable medium of claim 18, wherein:

the calls are identified by call identifiers;

the instructions to cause the processor to perform storing the different data usages in the database include instructions to cause the processor to perform indexing the different data usages in the database with at least the identifiers of the individual UEs and the call identifiers; and the instructions to cause the processor to perform retrieving include instructions to cause the processor to perform using the identifiers of the individual UEs and the call identifiers.

20. The non-transitory computer readable medium of claim 17, further comprising instructions to cause the processor to perform:

comparing each of the different service providers to a list of known service providers that have existing rate plans established with the home network; and when comparing indicates that a particular service provider among the different service providers is not on the list of known service providers, automatically sending to the particular service provider or an enterprise associated with the particular service provider a request to establish a new rate plane for the particular service provider on the home network.

* * * * *